(12) United States Patent
Mager et al.

(10) Patent No.: US 7,038,003 B2
(45) Date of Patent: *May 2, 2006

(54) POLYETHER ALLOPHANATES STABLE TOWARDS DISCOLOURATION

(75) Inventors: Michael Mager, Leverkusen (DE); Joachim Simon, Düsseldorf (DE); Malte Homann, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,994

(22) Filed: Mar. 23, 2005

(65) Prior Publication Data

US 2005/0222367 A1 Oct. 6, 2005

(30) Foreign Application Priority Data

Apr. 1, 2004 (DE) .................. 10 2004 015 985

(51) Int. Cl.
C08G 18/10 (2006.01)
C08G 18/48 (2006.01)
C07C 275/60 (2006.01)
C07C 271/66 (2006.01)
C07C 269/02 (2006.01)

(52) U.S. Cl. .......... 528/60; 252/182.2; 252/182.21; 252/182.22; 252/182.29; 528/48; 528/59; 528/61; 528/65; 528/67; 528/76; 560/26; 560/115; 560/158; 560/330; 560/331; 560/336; 560/355; 564/44; 564/45

(58) Field of Classification Search ............ 252/182.2, 252/182.21, 182.22, 182.29; 528/48, 59, 528/60, 61, 65, 67, 76; 560/26, 115, 158, 560/330, 331, 336, 355; 564/44, 45
See application file for complete search history.

(56) References Cited

U.S. PATENT DOCUMENTS

| | | | | |
|---|---|---|---|---|
| 4,160,080 A | * | 7/1979 | Koenig et al. | 528/59 |
| 4,177,342 A | * | 12/1979 | Bock et al. | 528/45 |
| 4,738,991 A | * | 4/1988 | Narayan | 521/124 |
| 5,081,211 A | | 1/1992 | Cassidy et al. | 528/67 |
| 5,124,427 A | * | 6/1992 | Potter et al. | 528/67 |
| 5,158,922 A | | 10/1992 | Hinney et al. | 502/175 |
| 5,232,988 A | * | 8/1993 | Venham et al. | 525/124 |
| 5,235,018 A | * | 8/1993 | Potter et al. | 528/49 |
| 5,258,482 A | * | 11/1993 | Jacobs et al. | 528/49 |
| 5,290,902 A | * | 3/1994 | Jacobs et al. | 528/49 |
| 5,470,813 A | | 11/1995 | Le-Khac | 502/175 |
| 5,589,431 A | | 12/1996 | Le-Khac | 502/175 |
| 5,606,001 A | * | 2/1997 | Shaffer | 528/49 |
| 5,648,447 A | * | 7/1997 | Seneker et al. | 528/63 |
| 5,670,601 A | * | 9/1997 | Allen et al. | 528/76 |
| 5,672,736 A | * | 9/1997 | Brahm et al. | 560/345 |
| 5,731,407 A | | 3/1998 | Le-Khac | 528/409 |
| 5,811,829 A | * | 9/1998 | Lawrey et al. | 252/182.24 |
| 6,392,001 B1 | | 5/2002 | Mertes et al. | 528/59 |

* cited by examiner

Primary Examiner—Rabon Sergent
(74) Attorney, Agent, or Firm—Joseph C. Gil

(57) ABSTRACT

A process for preparing polyisocyanate prepolymers containing allophanate structural units that includes reacting
  a) one or more polyisocyanates with
  b) one or more polyetherpolyols containing less than or equal to 0.02 milliequivalent of unsaturated end groups per gram of polyol and having a polydispersity of from 1.0 to 1.5 and/or an OH functionality of greater than or equal to 1.9
  to provide an NCO-functional polyurethane prepolymer containing urethane groups that are partly or fully allophanatized by further reaction with
  c) polyisocyanates, which may be different from those from a), and
  d) catalysts and optionally adding
  e) acidic additives before, during and/or after the allophanatization. The polyisocyanate prepolymers can be used to produce coatings, adhesive bonds and/or seals. The coatings include one or more of the polyisocyanate prepolymers, and at least one diol or polyol and/or at least one linear and/or cyclic, aliphatic, araliphatic and/or aromatic diamine or polyamine.

16 Claims, No Drawings

POLYETHER ALLOPHANATES STABLE TOWARDS DISCOLOURATION

CROSS REFERENCE TO RELATED PATENT APPLICATION

The present patent application claims the right of priority under 35 U.S.C. §119 (a)–(d) of German Patent Application No. 10 2004 015 985.8, filed Apr. 1, 2004.

BACKGROUND OF THE INVENTION

1. Field of the Invention

The invention relates to a process for preparing discolouration-stable polyisocyanate prepolymers containing allophanate structural units by using specific polyethers, to the process products thus obtainable and to their use for preparing polyurethanes and polyureas.

2. Description of the Prior Art

Polyisocyanate prepolymers containing allophanate structural units are of particular interest on account of their high NCO content at comparatively low viscosity. They represent useful crosslinkers for two-component polyurethane systems and with blocked NCO groups they can also be used in one-component polyurethane systems. Polyurethane systems of this kind are generally employed for producing coatings.

Polyisocyanate prepolymers containing allophanate structural units are known in principle. Thus EP-A 0 682 012, among other things, describes prepolymers based on diisocyanates and polyethers containing 1–4 hydroxyl groups, which are reacted using tin(II) compounds with an excess of the diisocyanates to give the corresponding allophanates.

According to the processes described, however, the polyisocyanate prepolymers obtained are frequently products which on storage, particularly at elevated temperatures, exhibit a distinct colour change. Furthermore, in the course of the said storage, there is often a decrease in the NCO content of the products and a considerable increase in their viscosity. Since the polyisocyanate prepolymers containing allophanate structural units are generally freed from excess diisocyanate by means of thin-film evaporation at high temperatures (e.g. 160° C.), the changes referred to (in colour, NCO content and viscosity) frequently occur even during preparation.

It was therefore an object of the present invention to provide new polyisocyanate prepolymers containing allophanate structural units which are endowed with markedly improved storage stability, and in particular with improved colour stability.

SUMMARY OF THE INVENTION

The present invention provides a process for preparing polyisocyanate prepolymers containing allophanate structural units. The process includes reacting a) one or more polyisocyanates with
b) one or more polyetherpolyols containing less than or equal to 0.02 milliequivalent of unsaturated end groups per gram of polyol (method of determination: ASTM D2849-69) and having a polydispersity (PD=$M_w/M_n$) of from 1.0 to 1.5 and/or an OH functionality of greater than or equal to 1.9 to provide an NCO-functional polyurethane prepolymer containing urethane groups that are partly or fully allophanatized by further reaction with
c) polyisocyanates, which may be different from those from a), and
d) catalysts and optionally adding
e) acidic additives before, during and/or after the allophanatization.

The present invention also provides polyisocyanate prepolymers containing allophanate structural units obtained according to the above-described process.

The present invention additionally provides a method of producing coatings, adhesive bonds and/or seals that includes applying a composition that contains the above-described polyisocyanate prepolymers containing allophanate structural units.

The present invention further provides coating compositions that include one or more of the above-described polyisocyanate prepolymers containing allophanate structural units, and at least one diol or polyol and/or at least one linear and/or cyclic, aliphatic, araliphatic and/or aromatic diamine or polyamine. The invention is also directed to substrates coated with coatings obtained from the above-described polyisocyanate prepolymers containing allophanate structural units.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Surprisingly it has now been found that polyisocyanate prepolymers containing allophanate structural units, prepared from specific polyetherpolyols with a small fraction of unsaturated groups, do not have the aforementioned disadvantages and in particular have a much better colour stability.

The present invention accordingly provides a process for preparing polyisocyanate prepolymers containing allophanate structural units, wherein a) one or more polyisocyanates are reacted with
b) one or more polyetherpolyols containing less than or equal to 0.02 milliequivalent of unsaturated end groups per gram of polyol (method of determination: ASTM D2849-69) and having a polydispersity (PD=$M_w/M_n$) of from 1.0 to 1.5 and/or an OH functionality of greater than or equal to 1.9 to give an NCO-functional polyurethane prepolymer, whose resultant urethane groups are partly or fully allophanatized with further reaction with
c) polyisocyanates, which may be different from those from a), and
d) catalysts and, before, during and/or after the allophanatization,
e) acidic additives are optionally added.

Likewise provided by the present invention are the polyisocyanate prepolymers containing allophanate structural units that are prepared in accordance with the process of the invention.

Suitable polyisocyanates of components a) and c) are the organic aliphatic, cycloaliphatic, aromatic or heterocyclic polyisocyanates which have at least two isocyanate groups per molecule and are known per se to the skilled person, and also mixtures thereof.

Examples of suitable aliphatic and cycloaliphatic polyisocyanates are di- or triisocyanates such as butane diisocyanate, pentane diisocyanate, hexane diisocyanate (hexamethylene diisocyanate, HDI), 4-isocyanatomethyl-1,8-octane diisocyanate (triisocyanatononane, TIN) or cyclic systems, such as 4,4'-methylene-bis(cyclohexyl isocyanate), 3,5,5-trimethyl-1-isocyanato-3-isocyanatomethylcyclohexane (isophorone diisocyanate, IPDI) and also ω,ω'-diisocyanato-1,3-dimethylcyclohexane ($H_6XDI$).

Aromatic polyisocyanates which can be used include for example 1,5-naphthalene diisocyanate, the isomeric diisocyanatodiphenylmethanes (MDI) and their higher molecular weight derivatives, diisocyanatomethylbenzene (2,4- and 2,6-tolylene diisocyanate, TDI), especially the 2,4- and the 2,6-isomers and technical-grade mixtures of the two isomers, and 1,3-bis(isocyanatomethyl)benzene (XDI). It is preferred, however, to use aliphatic and/or cycloaliphatic diisocyanates of the aforementioned kind as a constituent of components a) and c).

Particular preference is given to the use in components a) and c) of hexane diisocyanate (hexamethylene diisocyanate, HDI), 4,4'-methylenebis(cyclohexyl isocyanate) and/or 3,5,5-trimethyl-1-isocyanato-3-isocyanatomethylcyclohexane (isophorone diisocyanate, IPDI) as polyisocyanates. An especially preferred polyisocyanate is HDI.

Preferably the same polyisocyanates are used in a) and c).

The polyetherpolyols of component b) have number-average molecular weights $M_n$ of from 300 to 20 000 g/mol, preferably 1000 to 12000 g/mol, more preferably 1000 to 4000 g/mol.

Additionally they contain less than or equal to 0.02 milliequivalent of unsaturated end groups per gram of polyol (meq/g), preferably less than or equal to 0.015 meq/g, more preferably less than or equal to 0.01 meq/g (method of determination ASTM D2849-69).

Further, they have a particularly narrow molecular weight distribution, i.e. a polydispersity ($PD=M_w/M_n$) of from 1.0 to 1.5 and/or an OH functionality $\geq 1.9$. Preferably the said polyetherpolyols have a polydispersity of from 1.0 to 1.5 and an OH functionality of greater than 1.9, more preferably greater than or equal to 1.95.

The polyethers for use in accordance with the invention preferably have OH functionalities of <6, more preferably <4.

Polyetherpolyols of this kind are preparable in conventional fashion by alkoxylating suitable starter molecules, especially using double metal cyanide catalysts (DMC catalysis). This is described for example in U.S. Pat. No. 5,158,922 (e.g. Example 30) and EP-A 0 654 302 (p. 5, line 26 to p. 6, line 32).

Examples of suitable starter molecules for preparing the polyetherpolyols include simple polyols of low molecular weight, water, organic polyamines having at least two N—H bonds or any desired mixtures of such starter molecules. Alkylene oxides suitable for the alkoxylation are, in particular, ethylene oxide and/or propylene oxide, which can be used in any order or else in a mixture for the alkoxylation. Preferred starter molecules are simple polyols such as ethylene glycol, propylene 1,3-glycol and butane-1,4-diol, hexane-1,6-diol, neopentyl glycol, 2-ethylhexane-1,3-diol, glycerol, trimethylolpropane, pentaerythritol and also low molecular weight, hydroxyl-containing esters of such polyols with dicarboxylic acids or low molecular weight ethoxylation or propoxylation products of simple polyols of this kind, or any desired mixtures of compounds of this kind containing hydroxy groups.

The polyurethane prepolymers containing isocyanate groups are prepared by reacting the polyetherpolyols of component b) with excess amounts of the polyisocyanates from a). The reaction takes in general at temperatures from 20 to 140° C., preferably at 40 to 100° C., with the use where appropriate of catalysts known per se from polyurethane chemistry, such as tin soaps, an example being tin(II) bis(2-ethylhexanoate), organotin compounds, an example being dibutyltin dilaurate, or tertiary amines, an example being triethylamine or diazabicyclooctane.

The allophanatization then takes place subsequently by reaction of the polyurethane prepolymers containing isocyanate groups with polyisocyanates c), which may be the same as or different from those of component a), with the addition of suitable catalysts d) for the allophanatization. This is typically followed by the addition, for the purpose of stabilization, of the acidic additives of component e) and the removal from the product of excess polyisocyanate, by means for example of thin-film distillation or extraction.

The molar ratio of the OH groups of the compounds of component b) to the NCO groups of the polyisocyanates from a) and c) is preferably 1:1.5 to 1:20, more preferably 1:2 to 1:15, very preferably 1:5 to 1:15.

Examples of suitable catalysts d) for the allophanatization are zinc, tin and zirconium compounds, preference being given to zinc compounds and tin compounds. Particularly preferred tin and zinc compounds are tin(II) salts such as, for example, the Sn(II) dihalides, tin or zinc soaps such as Sn(II) bis(2-ethylhexanoate), Sn(II) bis(n-octoate), Zn(II) bis(2-ethylhexanoate) and Zn(II) bis(n-octoate), and also organotin compounds. Very particular preference is given to Zn(II) bis(2-ethylhexanoate).

These allophanatization catalysts are used typically in amounts of up to 5% by weight, based on the overall reaction mixture. It is preferred to add from 5 to 500 ppm of the catalyst, more preferably from 20 to 200 ppm.

As acidic additives of component e) can be Lewis acids (electron deficiency compounds) or Brønsted acids (protic acids) or compounds which react with water to release such acids.

These may, for example, be organic or inorganic acids or else neutral compounds such as acid halides or esters which react with water to form the corresponding acids. Mention may be made here in particular of hydrochloric acid, phosphoric acid, phosphoric esters, benzoyl chloride, isophthaloyl dichloride, p-toluenesulphonic acid, formic acid, acetic acid, dichloroacetic acid and 2-chloropropionic acid.

Where acidic additives are used at all, they are preferably organic acids such as carboxylic acids or acid halides such as benzoyl chloride or isophthaloyl dichloride.

The acidic additives are generally added at least in an amount such that the molar ratio of the acidic centres of the acidic additives to the catalytically active centres of the catalyst is at least 1:1. Preferably, however, an excess of the acidic additives is added.

Thin-film distillation is the preferred method of separating off excess diisocyanate, and it is generally carried out at temperatures from 100 to 160° C. under a pressure of from 0.01 to 3 mbar. The residual monomer content thereafter is preferably less than 1% by weight, more preferably less than 0.5% by weight (diisocyanate).

The process steps in their entirety can be carried out optionally in the presence of inert solvents. Inert solvents in this context are those which under the given reaction conditions do not react with the reactants. Examples are ethyl acetate, butyl acetate, methoxypropyl acetate, methyl ethyl ketone, methyl isobutyl ketone, toluene, xylene, aromatic or (cyclo)aliphatic hydrocarbon mixtures or any desired mixtures of such solvents. With preference, however, the reactions according to the invention are conducted solventlessly.

The components involved, both for the preparation of the prepolymers containing isocyanate groups and for allophanatization, can be added in any order. It is nevertheless preferred to add the polyetherpolyol b) to an initial charge of the polyisocyanate of components a) and c) and finally to add the allophanatization catalyst d).

In one preferred embodiment of the invention the polyisocyanates of components a) and c) are charged to a suitable reaction vessel and this initial charge is heated at from 40 to 100° C., optionally with stirring. After it has reached the desired temperature, the polyhydroxy compounds of component b) are added with stirring, and stirring is continued until the NCO content is at or just below the theoretical NCO content of the polyurethane prepolymer that is anticipated in accordance with the chosen stoichiometry. Then the allophanatization catalyst d) is added and the reaction mixture is heated at 50 and 100° C. until the NCO content is at or just below the desired NCO content. Subsequently, for the purpose of stabilization, the acidic additives of component e) can be added before the reaction mixture is cooled or is passed on directly for thin-film distillation. In that operation the excess polyisocyanate is separated off at temperatures from 100 to 160° C. under a pressure of from 0.01 to 3 mbar down to a residual monomer content of less than 1%, preferably less than 0.5%. Following the thin-film distillation it is possible optionally to add further acidic additives of component e) as stabilizer.

The allophanates formed in the process according to the invention correspond typically to the general formula (I)

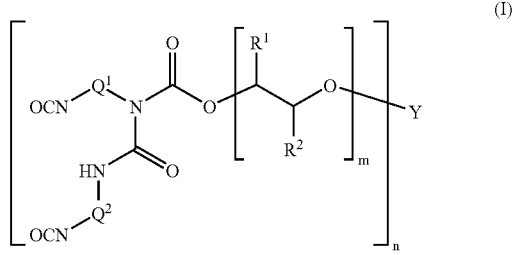

in which $Q^1$ and $Q^2$ independently of one another are the radical of a linear and/or cyclic aliphatic diisocyanate of the stated type, preferably —$(CH_2)_6$—, $R^1$ and $R^2$ independently of one another are hydrogen or a $C_1$–$C_4$ alkyl radical, $R^1$ and $R^2$ preferably being hydrogen and/or methyl groups, Y is the radical of a starter molecule of the stated type, with a functionality of from 2 to 6, and accordingly n is a number from 2 to 6, which as a result of the use of different starter molecules need not of course necessarily be a whole number, and m preferably corresponds to a number of monomer units such that the number-average molecular weight of the polyether on which the structure is based is 300 to 20 000 g/mol.

Preferably the allophanates obtained are those corresponding to the general formula (II)

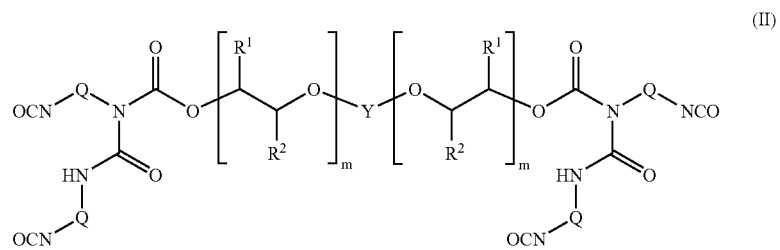

in which

Q is the radical of a linear and/or cyclic aliphatic diisocyanate of the stated type, preferably —$(CH_2)_6$—, $R^1$ and $R^2$ independently of one another are hydrogen or a $C_1$–$C_4$ alkyl radical, $R^1$ and $R^2$ preferably being hydrogen and/or methyl groups, Y is the radical of a difunctional starter molecule of the stated kind and m corresponds to a number of monomer units such that the number-average molecular weight of the polyether on which the structure is based is 300 to 20 000 g/mol.

The allophanates stabilized in accordance with the invention typically have weight-average molecular weights of from 700 to 50 000 g/mol, preferably 1500 to 15 000 g/mol and more preferably 1500 to 8000 g/mol.

The allophanates stabilized in accordance with the invention typically have viscosities at 23° C. of from 500 to 100 000 mPas, preferably 500 to 50 000 mPas and more preferably 1000 to 7500 mPas, very preferably from 1000 to 3500 mPas. The allophanates stabilized in accordance with the invention can be used for example for preparing polyurethanes, polyureas or polyurethane-ureas, by reacting them with suitable polyols or polyamines, respectively, or else with a mixture of both. The reaction may take place at room temperature or below, but also at elevated temperatures (baking). The resulting polyurethanes or polyureas are themselves particularly suitable as a coating.

Consequently the invention additionally provides coating compositions which comprise
one or more of the allophanates of the invention and
at least one diol or polyol and/or at least one linear and/or cyclic, aliphatic, araliphatic and/or aromatic diamine or polyamine.

The allophanates prepared by the process of the invention are notable for their very high compatibility with the aforementioned components B) and C). In particular the combination of A) and C) leads to homogeneous (polyurea) coatings.

The coating compositions referred to can be applied to surfaces by the conventional techniques such as spraying, dipping, flow coating or pouring. After flashing off to remove any solvents present, the coatings then cure under ambient conditions or else at higher temperatures of, for example, 40 to 200° C. The stated coating compositions can be applied for example to metals, plastics, ceramic, glass and also natural substances, it being possible for the said substrates to have been subjected beforehand to a pretreatment that may be necessary.

EXAMPLES

Working Examples

Unless mention is made to the contrary, all percentages should be understood as being weight percent.

The NCO contents were determined by back-titration of excess added di-n-butylamine with hydrochloric acid.

The viscosities were determined using a rotational viscometer from Haake at 23° C.

The colour number was determined in accordance with DIN EN 1557 (Hazen).

Comparative Example 1

275.5 g of 1,6-hexane diisocyanate was admixed first with 120 mg of a 10% strength solution of isophthaloyl dichloride in n-butyl acetate and then the mixture was heated to 100° C. with stirring. Thereafter, over the course of about 3 hours, 327.9 g were added of a polypropylene glycol which had been obtained by means of base-catalysed propylene oxide polymerization (molar weight 2000 g/mol, OH number 56 mg KOH/g, theoretical functionality 2). The reaction mixture was thereafter heated at 100° C. until an NCO content of 20.7% was reached. At that point the temperature was lowered to 90° C. and the reaction mixture, following the addition of 50 mg of zinc(II) bis(2-ethylhexanoate), was stirred until the NCO content was 18.4%. Following the addition of 50 mg of isophthaloyl dichloride the excess 1,6-hexane diisocyanate was removed by means of thin-film distillation at about 0.5 mbar and 140° C.

This gave a product which was clear but had a marked yellow colouration, with a Hazen colour number of 123, and with an NCO content of 5.07% and a viscosity of 2180 mPas (23° C.).

Comparative Example 2

470.1 g of 1,6-hexane diisocyanate were heated to 100° C. with stirring. Thereafter, over the course of about 3 hours, 279.8 g were added of a polypropylene glycol which had been obtained by means of base-catalysed propylene oxide polymerization (molar weight 1000 g/mol, OH number 112 mg KOH/g, theoretical functionality 2). The reaction mixture was thereafter heated at 100° C. until an NCO content of 28.2% was reached. At that point the temperature was lowered to 90° C. and the reaction mixture, following the addition of 60 mg of zinc(II) bis(2-ethylhexanoate), was stirred until the NCO content was 25.1%. Following the addition of 40 mg of dibutyl phosphate the excess 1,6-hexane diisocyanate was removed by means of thin-film distillation at about 0.5 mbar and 140° C.

This gave a slightly turbid, yellowish product having a Hazen colour number of 32, an NCO content of 9.85% and a viscosity of 6570 mPas (23° C.).

Example 1

275.5 g of 1,6-hexane diisocyanate were first admixed with 120 mg of a 10% strength solution of isophthaloyl dichloride in n-butyl acetate and then the mixture was heated to 100° C. with stirring. Then, over the course of about 3 hours, 324.3 g were added of a polypropylene glycol which had been prepared by means of DMC catalysis (base-free) (amount of unsaturated groups <0.01 meq/g, molar weight 2000 g/mol, OH number 56 mg KOH/g, theoretical functionality 2) had. Thereafter the reaction mixture was heated at 100° C. until an NCO content of 20.7% was reached. At that point the temperature was lowered to 90° C. and the reaction mixture, following the addition of 50 mg of zinc(II) bis(2-ethylhexanoate), was stirred until the NCO content was 18.4%. Following the addition of 50 mg of isophthaloyl dichloride the excess 1,6-hexane diisocyanate was removed by means of thin-film distillation at 0.3 mbar and 140° C.

This gave a clear product having a Hazen colour number of 5, an NCO content of 5.15% and a viscosity of 2560 mPas (23° C.). The colour number is much lower than that of the corresponding product obtained in accordance with Comparative Example 1.

Example 2

502.4 g of 1,6-hexane diisocyanate were heated to 100° C. with stirring. Then, over the course of about 3 hours, 297.5 g were added of a polypropylene glycol which had been obtained by means of DMC catalysis (base-free) (molar weight 1000 g/mol, OH number 112 mg KOH/g, theoretical functionality 2). The reaction mixture was subsequently heated at 100° C. until an NCO content of 28.2% was reached. At that point the temperature was lowered to 90° C. and the reaction mixture, following the addition of 70 mg of zinc(II) bis(2-ethylhexanoate), was stirred until the NCO content was 25.1%. Following the addition of 40 mg of dibutyl phosphate the excess 1,6-hexane diisocyanate was removed by means of thin-film distillation at about 0.5 mbar and 140° C.

This gave a colourless product having a Hazen colour number of 0, an NCO content of 8.95% and a viscosity of 3500 mPas (23° C.). The colour number is much lower than that of the corresponding product obtained in accordance with Comparative Example 2.

Example 3

336.0 g of 1,6-hexane diisocyanate were first admixed with 120 mg of a 10% strength solution of isophthaloyl dichloride in n-butyl acetate and then the mixture was heated to 100° C. with stirring. Then, over the course of about 3 hours, 263.8 g were added of a polypropylene glycol which had been prepared by means of DMC catalysis (base-free) (amount of unsaturated groups <0.01 meq/g, molar weight 2000 g/mol, OH number 56 mg KOH/g, theoretical functionality 2). Thereafter the reaction mixture was heated at 100° C. until an NCO content of 26.1% was reached. At that point the temperature was lowered to 90° C. and the reaction mixture, following the addition of 50 mg of zinc(II) bis(2-ethylhexanoate), was stirred until the NCO content was 24.3%. Following the addition of 50 mg of isophthaloyl dichloride the excess 1,6-hexane diisocyanate was removed by means of thin-film distillation at 0.6 mbar and 140° C.

This gave a colourless, clear product having a NCO content of 6.45% and a viscosity of 2860 mPas (23° C.).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polyisocyanate prepolymers containing allophanate structural units comprising reacting
   a) one or more polyisocyanates with
   b) one or more polyetherpolyols containing less than or equal to 0.02 milliequivalent of unsaturated end groups per gram of polyol (method of determination: ASTM D2849-69) and having a polydispersity ($PD=M_w/M_n$) of from 1.0 to 1.5 and/or an OH functionality of greater than or equal to 1.9
   to provide an NCO-functional polyurethane prepolymer comprising urethane groups that are partly or fully allophanatized by further reaction with
   c) polyisocyanates, which may be different from those from a), and
   d) catalysts and optionally adding
   e) acidic additives before, during and/or after the allophanatization.

2. The process for preparing polyisocyanate prepolymers containing allophanate structural units according to claim 1, wherein the same polyisocyanates are used for components a) and c).

3. The process for preparing polyisocyanate prepolymers containing allophanate structural units according to claim 1, wherein the polyisocyanates in components a) and c) are aliphatic and/or cycloaliphatic polyisocyanates.

4. Polyisocyanate prepolymers containing allophanate structural units, obtained by a process according to claim 1.

5. A method of producing coatings, adhesive bonds and/or seals comprising applying a composition including the polyisocyanate prepolymers containing allophanate structural units according to claim 4.

6. Coating compositions comprising
   one or more polyisocyanate prepolymers containing allophanate structural units according to claim 4 and
   at least one diol or polyol and/or
   at least one linear and/or cyclic, aliphatic, araliphatic and/or aromatic diamine or polyamine.

7. Substrates coated with coatings obtained from polyisocyanate prepolymers containing allophanate structural units according to claim 4.

8. The process for preparing polyisocyanate prepolymers containing allophanate structural units according to claim 2, wherein the polyisocyanates in components a) and c) are aliphatic and/or cycloaliphatic polyisocyanates.

9. Polyisocyanate prepolymers containing allophanate structural units, obtained by a process according to claim 2.

10. A method of producing coatings, adhesive bonds and/or seals comprising applying a composition including the polyisocyanate prepolymers containing allophanate structural units according to claim 9.

11. Coating compositions comprising
    one or more polyisocyanate prepolymers containing allophanate structural units according to claim 9 and
    at least one diol or polyol and/or
    at least one linear and/or cyclic, aliphatic, araliphatic and/or aromatic diamine or polyamine.

12. Substrates coated with coatings obtained from polyisocyanate prepolymers containing allophanate structural units according to claim 9.

13. Polyisocyanate prepolymers containing allophanate structural units, obtained by a process according to claim 3.

14. A method of producing coatings, adhesive bonds and/or seals comprising applying a composition including the polyisocyanate prepolymers containing allophanate structural units according to claim 13.

15. Coating compositions comprising
    one or more polyisocyanate prepolymers containing allophanate structural units according to claim 13 and
    at least one diol or polyol and/or
    at least one linear and/or cyclic, aliphatic, araliphatic and/or aromatic diamine or polyamine.

16. Substrates coated with coatings obtained from polyisocyanate prepolymers containing allophanate structural units according to claim 13.

* * * * *